US011400772B2

(12) United States Patent
Bout et al.

(10) Patent No.: US 11,400,772 B2
(45) Date of Patent: Aug. 2, 2022

(54) SCANNING METHOD AND DEVICE FOR TIRE PRESSURE MONITORING SYSTEM (TPMS) PROTOCOLS

(71) Applicant: ATEQ, Les Clayes sous Bois (FR)

(72) Inventors: Michel Bout, Shanghai (CN); Bruno Rousseau, Cupertino, CA (US)

(*) Notice: Subject to any disclaimer, the term of this patent is extended or adjusted under 35 U.S.C. 154(b) by 324 days.

(21) Appl. No.: 16/801,599

(22) Filed: Feb. 26, 2020

(65) Prior Publication Data

US 2021/0260936 A1   Aug. 26, 2021

(51) Int. Cl.
*B60C 23/04* (2006.01)
*B60C 23/06* (2006.01)

(52) U.S. Cl.
CPC ...... *B60C 23/0474* (2013.01); *B60C 23/0479* (2013.01); *B60C 23/067* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009;
(Continued)

(56) References Cited

U.S. PATENT DOCUMENTS 4,398,172 A   8/1983   Carroll et al.
4,642,783 A   2/1987   Alexander et al.
(Continued)

FOREIGN PATENT DOCUMENTS

CA    2608842 A1 *  4/2008    ......... B60C 23/0408
CN    103921692 A    7/2014
(Continued)

OTHER PUBLICATIONS

Bartec USA TPMS Professionals, TECH400SD-TECH400SD Tool Bartec, pp. 1-2. http://www.bartechusa.com/tech400sd.html. Website last visited Aug. 16, 2016.
(Continued)

*Primary Examiner* — Andre J Allen
(74) *Attorney, Agent, or Firm* — Young Basile Hanlon & MacFarlane, P.C.

(57) ABSTRACT

A method and device may be used for scanning communication protocols for a sensor of a motor vehicle electronic tire pressure monitoring system. The method may include selecting a make and a model of a motor vehicle. The method may include transmitting one or more activation signals. The one or more activation signals may be transmitted in sequential order according to a scanning protocol. The scanning protocol may be based on a predefined parameter. Each of the one or more activation signals may be associated with a different communication protocol. The method may include stopping the transmission of the one or more activation signals on a condition that a signal from a sensor is received.

27 Claims, 4 Drawing Sheets

(58) Field of Classification Search
CPC ......... B60C 23/0425; B60C 2019/004; B60C
23/004; B60C 11/243; B60C 23/00354;
B60C 23/045; B60C 23/0464; B60C
23/003; B60C 23/00318; B60C 23/0472;
B60C 23/066; B60C 23/00372; B60C
23/0403; B60C 23/04985; B60C 23/0406;
B60C 29/02; B60C 11/00; B60C 23/006;
B60C 23/044; B60C 23/00; B60C 23/008;
B60C 23/0455; B60C 23/0454; B60C
23/0461; B60C 23/0483; B60C 23/0474;
B60C 23/0415; B60C 23/0491; B60C
23/0489; B60C 25/002; B60C 29/064;
B60C 23/00363; B60C 23/0471; B60C
11/0318; B60C 23/0459; B60C 23/0481;
B60C 2019/005; B60C 23/002; B60C
23/042; B60C 23/0422; B60C 23/0423;
B60C 23/0466; B60C 2200/02; B60C
23/0405; B60C 23/0477; B60C 29/06;
B60C 13/001; B60C 23/0437; B60C
23/0476; B60C 25/132; B60C 23/0447;
B60C 23/0427; B60C 23/0449; B60C
25/00; B60C 9/18; B60C 13/00; B60C
19/003; B60C 23/0484; B60C 23/065;
B60C 23/00336; B60C 23/0486; B60C
23/08; B60C 17/00; B60C 2019/006;
B60C 23/001; B60C 25/142; B60C 17/02;
B60C 23/00345; B60C 23/0445; B60C
5/004; B60C 11/0083; B60C 25/145;
B60C 29/00; B60C 9/02; B60C 11/0332;
B60C 23/0457; B60C 23/12; B60C 25/18;
B60C 11/13; B60C 23/0418; B60C
23/0469; B60C 29/066; B60C 23/068;
B60C 25/005; B60C 25/138; B60C 11/03;
B60C 23/005; B60C 23/0432; B60C 3/00;
B60C 5/14; B60C 99/00; B60C 11/11;
B60C 17/04; B60C 17/06; B60C 23/063;
B60C 23/10; B60C 25/007; B60C
25/0554; B60C 25/14; B60C 29/062;
B60C 99/003; B60C 11/032; B60C 11/12;
B60C 13/003; B60C 19/001; B60C
23/0435; B60C 23/127; B60C 23/16;
B60C 29/068; B60C 3/04; B60C 9/20;
B60C 11/01; B60C 11/0302; B60C 13/02;
B60C 23/126; B60C 25/056; B60C
29/005; B60C 29/04; B60C 5/142; B60C
11/0304; B60C 11/0306; B60C 15/06;
B60C 2009/2038; B60C 2011/0374;
B60C 2011/0388; B60C 2011/1213;
B60C 2011/1231; B60C 2011/1245;
B60C 2200/065; B60C 23/00305; B60C
23/067; B60C 23/135; B60C 23/137;
B60C 23/18; B60C 25/02; B60C 7/12;
B60C 11/02; B60C 17/0009; B60C
19/002; B60C 19/08; B60C 19/12; B60C
2019/007; B60C 23/00347; B60C 23/131;
B60C 25/05; B60C 5/001; B60C 5/22;
B60C 1/0008; B60C 1/0016; B60C
11/0058; B60C 11/0311; B60C 11/033;
B60C 11/1218; B60C 11/124; B60C
11/1384; B60C 13/04; B60C 15/0036;
B60C 15/024; B60C 17/041; B60C
17/066; B60C 2007/005; B60C
2009/0071; B60C 2009/022; B60C
2009/2025; B60C 2011/0358; B60C
2011/1254; B60C 2017/068; B60C
2200/06; B60C 2200/12; B60C 2200/14;
B60C 23/121; B60C 23/123; B60C
23/133; B60C 25/0503; B60C 25/0515;
B60C 25/0521; B60C 25/0551; B60C
25/15; B60C 25/16; B60C 29/007; B60C
3/06; B60C 5/002; B60C 5/02; B60C
5/20; B60C 7/00; B60C 7/105; B60C
9/005; B60C 9/1807; B60C 9/28; B60C
2011/0033; B60C 23/085; B60C 25/0548;
B60C 25/185; B60C 7/107; B60C 9/22;
G01M 17/02; G01M 17/022; G01M
17/027; G01M 17/021; G01M 17/024;
G01M 17/025; G01M 17/013; G01M
17/007; G01M 1/045; G01M 17/06;
G01M 1/02; G01M 1/326; G01M 1/30;
G01M 5/0058; G01M 1/26; G01M
17/0074; G01M 1/225; G01M 17/04;
G01M 17/065; G01M 17/0072; G01M
17/10; G01M 7/00; G01M 1/16; G01M
99/00; G01M 7/08; G01M 1/34; G01M
17/028; G01M 17/045; G01M 3/3218;
G01M 1/04; G01M 3/40; G01M 17/08;
G01M 5/0091; G01M 1/365; G01M
13/04; G01M 17/03; G01M 5/0066;
G01M 1/08; G01M 1/22; G01M 13/027;
G01M 5/0033; G01M 1/00; G01M 1/122;
G01M 15/044; G01M 3/24; G01M
3/2876; G01M 5/0075; G01M 1/06;
G01M 1/12; G01M 1/24; G01M 1/32;
G01M 1/36; G01M 11/081; G01M
13/023; G01M 13/025; G01M 17/00;
G01M 17/0076; G01M 3/022; G01M
3/042; G01M 3/045; G01M 3/147; G01M
3/227; G01M 3/3236; G01M 5/0016;
G01M 5/0025; G01M 5/0083; G01M
7/022; G01M 7/025; G01M 7/04; G01M
7/06; G01M 9/02; G01M 9/04; G01M
99/002; G01M 99/004; G01M 3/002;
G01M 3/04; G01M 7/02; G01M 9/06
USPC .................................................. 73/146–146.8
See application file for complete search history.

(56) References Cited

U.S. PATENT DOCUMENTS

| | | |
|---|---|---|
| 4,873,654 A | 10/1989 | Alexander et al. |
| 4,904,939 A | 2/1990 | Mian |
| 4,967,485 A | 11/1990 | Brown et al. |
| 4,998,438 A | 3/1991 | Martin |
| 5,608,376 A | 3/1997 | Ito et al. |
| 5,883,306 A | 3/1999 | Hwang |
| 6,081,098 A | 6/2000 | Bertness et al. |
| 6,111,524 A | 8/2000 | Lesesky et al. |
| 6,237,723 B1 | 5/2001 | Salsman |
| 6,441,732 B1 | 8/2002 | Laitsaari et al. |
| 6,505,507 B1 | 1/2003 | Imao et al. |
| 6,611,740 B2 | 8/2003 | Lowrey et al. |
| 6,612,165 B2 | 9/2003 | Juzswik et al. |
| 6,718,818 B2 | 4/2004 | Dutt et al. |
| 6,804,999 B2 | 10/2004 | Okubo |
| 6,826,951 B1 | 12/2004 | Schuessler, Jr. et al. |
| 6,904,796 B2 | 6/2005 | Pacsai et al. |
| 6,931,744 B1 | 8/2005 | Ikerd, Jr. et al. |
| 6,937,144 B2 | 8/2005 | Drake et al. |
| 6,980,115 B2 | 12/2005 | Deniau |
| 7,040,151 B2 | 5/2006 | Graham et al. |
| 7,119,661 B2 | 10/2006 | Desai et al. |
| 7,225,666 B2 | 6/2007 | Welch et al. |

(56) References Cited

U.S. PATENT DOCUMENTS

| | | |
|---|---|---|
| 7,250,852 B1 | 7/2007 | Kell |
| 7,280,898 B2 | 10/2007 | Lesesky et al. |
| 7,449,993 B2 | 11/2008 | Lesesky et al. |
| 7,564,344 B2 | 7/2009 | Deniau et al. |
| 7,589,619 B2 | 9/2009 | DeKeuster et al. |
| 7,623,021 B2 | 11/2009 | Desai et al. |
| 7,639,122 B2 | 12/2009 | Kochie et al. |
| 7,656,162 B2 | 2/2010 | Vonderhaar et al. |
| 7,688,192 B2 | 3/2010 | Kenny et al. |
| 7,694,557 B2 | 4/2010 | Hettle et al. |
| 7,734,391 B2 | 6/2010 | Deniau et al. |
| 7,797,995 B2 | 9/2010 | Schafer |
| 7,810,390 B2 | 10/2010 | Hettle et al. |
| 7,845,091 B2 | 12/2010 | Clark |
| 7,924,148 B2 | 4/2011 | Costello et al. |
| 7,940,052 B2 | 5/2011 | Vonderhaar et al. |
| 7,944,346 B2 | 5/2011 | De Castro et al. |
| 8,035,499 B2 | 10/2011 | Kochie et al. |
| 8,183,993 B2 | 5/2012 | Wittliff et al. |
| 8,186,208 B2 | 5/2012 | Matsumura |
| 8,220,324 B2 | 7/2012 | Kokubu et al. |
| 8,230,689 B2 | 7/2012 | Kmetz et al. |
| 8,502,655 B2 | 8/2013 | Deniau et al. |
| 8,576,060 B2 | 11/2013 | Deniau et al. |
| 8,635,091 B2 | 1/2014 | Amigo et al. |
| 8,674,821 B2 | 3/2014 | Togawa |
| 9,050,862 B2 | 6/2015 | Mouchet |
| 9,051,976 B2 | 6/2015 | Kuwahara et al. |
| 9,091,537 B2 | 7/2015 | Farr et al. |
| 9,122,423 B2 | 9/2015 | McIntyre et al. |
| 9,384,597 B2 | 7/2016 | Koch et al. |
| 9,779,561 B1 | 10/2017 | Dorrance et al. |
| 10,875,365 B2 * | 12/2020 | Mouchet ............... B60C 23/0467 |
| 2002/0130771 A1 | 9/2002 | Osborne et al. |
| 2002/0149477 A1 | 10/2002 | Desai et al. |
| 2003/0006895 A1 | 1/2003 | Drake et al. |
| 2003/0048178 A1 | 3/2003 | Bonardi et al. |
| 2003/0145650 A1 | 8/2003 | Juzswik et al. |
| 2004/0150369 A1 | 8/2004 | Deniau |
| 2004/0164140 A1 | 8/2004 | Voeller et al. |
| 2004/0206167 A1 | 10/2004 | Pacsai et al. |
| 2004/0236485 A1 | 11/2004 | Deniau et al. |
| 2005/0030170 A1 | 2/2005 | Rieck et al. |
| 2005/0132792 A1 | 6/2005 | Lemense et al. |
| 2005/0134428 A1 | 6/2005 | Desai et al. |
| 2005/0162263 A1 | 7/2005 | Fennel et al. |
| 2006/0025897 A1 | 2/2006 | Shostak et al. |
| 2006/0049915 A1 | 3/2006 | Deniau et al. |
| 2006/0211410 A1 | 9/2006 | Deniau et al. |
| 2006/0261933 A1 | 11/2006 | Deniau et al. |
| 2007/0069877 A1 | 3/2007 | Fogelstrom |
| 2007/0090919 A1 | 4/2007 | Desai et al. |
| 2007/0090928 A1 | 4/2007 | Deniau et al. |
| 2007/0193349 A1 | 8/2007 | Petrucelli |
| 2008/0110252 A1 | 5/2008 | Cook |
| 2008/0133081 A1 | 6/2008 | Colarelli et al. |
| 2008/0164988 A1 | 7/2008 | DeKeuster et al. |
| 2008/0173082 A1 | 7/2008 | Hettle et al. |
| 2008/0202659 A1 | 8/2008 | Hettle et al. |
| 2008/0204217 A1 | 8/2008 | Costello et al. |
| 2008/0205553 A1 | 8/2008 | Costello et al. |
| 2008/0266068 A1 | 10/2008 | Farrell et al. |
| 2008/0302425 A1 | 12/2008 | Hettle et al. |
| 2009/0000311 A1 | 1/2009 | Kmetz et al. |
| 2009/0033478 A1 | 2/2009 | Deniau et al. |
| 2009/0121856 A1 | 5/2009 | Stegman et al. |
| 2009/0267751 A1 * | 10/2009 | Wittliff ............... B60C 23/0454 340/442 |
| 2009/0309709 A1 | 12/2009 | Bevacqua et al. |
| 2011/0106464 A1 | 5/2011 | Petrucelli |
| 2011/0140876 A1 | 6/2011 | Deniau |
| 2011/0161049 A1 * | 6/2011 | Wittliff ............... B60C 23/0479 702/182 |
| 2011/0205047 A1 | 8/2011 | Patel et al. |
| 2011/0221587 A1 | 9/2011 | Katou |
| 2011/0257817 A1 | 10/2011 | Tieman |
| 2012/0117788 A1 | 5/2012 | Deniau et al. |
| 2012/0119895 A1 | 5/2012 | Deniau et al. |
| 2012/0185110 A1 | 7/2012 | Deniau et al. |
| 2012/0197873 A1 | 8/2012 | Uramoto et al. |
| 2012/0232753 A1 | 9/2012 | Lhuillier et al. |
| 2012/0235807 A1 | 9/2012 | Rysenga et al. |
| 2012/0296513 A1 | 11/2012 | Ramseyer |
| 2012/0302191 A1 | 11/2012 | Farrell et al. |
| 2012/0323690 A1 | 12/2012 | Michael |
| 2013/0038440 A1 | 2/2013 | Deniau et al. |
| 2013/0038441 A1 | 2/2013 | Deniau et al. |
| 2013/0038442 A1 | 2/2013 | Deniau et al. |
| 2013/0038443 A1 | 2/2013 | Deniau et al. |
| 2013/0061456 A1 | 3/2013 | Lefaure et al. |
| 2013/0106596 A1 * | 5/2013 | Mouchet ............. B60C 23/0472 340/445 |
| 2013/0145834 A1 | 6/2013 | Mouchet |
| 2013/0158777 A1 | 6/2013 | Brauer et al. |
| 2013/0169813 A1 | 7/2013 | Schaefer |
| 2013/0185005 A1 | 7/2013 | Petrucelli et al. |
| 2013/0282231 A1 | 10/2013 | Farr et al. |
| 2014/0039752 A1 | 2/2014 | Juzswik |
| 2014/0195099 A1 | 7/2014 | Chen |
| 2014/0279707 A1 | 9/2014 | Joshua et al. |
| 2014/0288859 A1 | 9/2014 | Wittmann |
| 2014/0308971 A1 | 10/2014 | O'Brien et al. |
| 2015/0001539 A1 | 1/2015 | Smith et al. |
| 2015/0015388 A1 | 1/2015 | McIntyre et al. |
| 2015/0015390 A1 | 1/2015 | McIntyre et al. |
| 2015/0029016 A1 | 1/2015 | Lesesky et al. |
| 2015/0054640 A1 | 2/2015 | Huang et al. |
| 2015/0239305 A1 * | 8/2015 | Deniau ............... B60C 23/0462 340/442 |
| 2016/0082791 A1 | 3/2016 | Lin |
| 2016/0214445 A1 | 7/2016 | Sogabe |
| 2016/0236522 A1 | 8/2016 | Taki |
| 2017/0028796 A1 | 2/2017 | Patel et al. |
| 2018/0079015 A1 * | 3/2018 | Marsh .................. G06V 20/66 |
| 2018/0194176 A1 * | 7/2018 | Bout ................ B60C 23/0472 |
| 2019/0103677 A1 | 4/2019 | Nikitin |
| 2019/0255893 A1 * | 8/2019 | Van Wiemeersch ........................ B60C 23/0479 |

FOREIGN PATENT DOCUMENTS

| | | |
|---|---|---|
| CN | 204605424 U | 9/2015 |
| CN | 105784272 A | 7/2016 |
| CN | 104908003 B | 1/2017 |
| CN | 106585295 B | 12/2018 |
| DE | 10050984 A1 | 5/2002 |
| DE | 20315000 U1 | 12/2003 |
| DE | 102010026729 A1 | 1/2012 |
| EP | 1026015 A2 | 8/2000 |
| EP | 1769948 A2 | 4/2007 |
| EP | 1972468 A1 | 9/2008 |
| EP | 2777957 A2 | 9/2014 |
| EP | 3 293 019 A1 | 3/2018 |
| GB | 2429819 A | 3/2007 |
| JP | 2008100613 A | 5/2008 |
| JP | 2012201332 A | 10/2012 |
| WO | 9308035 A1 | 4/1993 |
| WO | 0236368 A1 | 5/2002 |
| WO | 2008000491 A1 | 1/2008 |
| WO | 2010115390 A1 | 10/2010 |
| WO | 2017/102191 A1 | 6/2017 |
| WO | 201820143 A1 | 2/2018 |
| WO | 2019114758 A1 | 6/2019 |

OTHER PUBLICATIONS

ATEQ Quickset TPMS Tool, ATEQ TPMS Light Reset Tool QuickSet, pp. 1-3.

OTC TPR Activation Tool, pp. 1-5. http://www.otctools.com/products/tpr-activation-tool. Website last visited Aug. 17, 2016.

OTC TPM Electronic Torque Wrench model 3822-25, www.otctools.com<http://www.otctools.com>.

(56) References Cited

OTHER PUBLICATIONS

KTC Digital Ratchet Torque Wrench Series GEK, www.gaugecity.com <http://www.gaugecity.com>.
Schrader Nut Torque Wrench Set 20139, www.TPMS.com <http://www.TPMS.com>.
ACDelco "ARM303-4A-340 Digital Angle Torque Wrench" Product Information Manual.
Anonymous: "ARM331-21 1/4" Interchangeable Digital Torque Wrench" Jul. 6, 2015 (Jul. 6, 2015), XP055318741, Retrieved from the Internet; URL: http://www.acdelco-tools.com/index.php?route=product/product&product_id-177 [retrieved on Nov. 11, 2016] the whole document.
International Search Report PCT/IB2016/01294, dated Nov. 23, 2016.
Jacques Mouchet, ATEQ User Manual ATEQ VT 55, Retrieved on Jan. 10, 2013 from the internet: www.orange-electronic,com/en/products/oe_sensor/VT55d-UOS.pdf, Nov. 1, 2009, pp. 1-38.
European Intellectual Property Office, International Search Report and Written Opinion, dated Dec. 20, 2013.
European Intellectual Property Office, International Search Report and Written Opinion, dated Mar. 12, 2014.
ATEQ, Archive website http://web.archive.org/web/20091129111948/http://www.ateq-tpms.com/TPMS-tool-BOX.php, Nov. 29, 2009.
Vitale et al., A Dry Air Leak Test Primer, Jun. 1, 2006, Quality First Systems, Inc.
DORAN 360 CE Tire Pressure Monitoring Brochure, Sep. 13, 2012, DORAN Manufacturing, LLC, www.DORANMFG.com.
European Intellectual Property Office, European Search Report, dated Dec. 20, 2013.
European Intellectual Property Office, European Search Report, dated Mar. 12, 2014.

\* cited by examiner

SCANNING METHOD AND DEVICE FOR TIRE PRESSURE MONITORING SYSTEM (TPMS) PROTOCOLS

TECHNICAL FIELD

This disclosure generally relates to tools for use with vehicle tire pressure monitoring systems (TPMS). The disclosure more particularly relates to a method for scanning TPMS protocols, as well as to a device configured for carrying out the scanning method.

BACKGROUND

In 2007, the United States federal laws implemented and required most passenger vehicles to include a tire pressure monitoring system (TPMS) to monitor and alert drivers of low tire pressure which degrades vehicle efficiency, performance and improves safety.

Conventional TPM systems include a tire sensor installed in the wheel, often the valve stem of pneumatic vehicle tire. These sensors are configured to monitor several conditions of the tire including: tire air pressure, tire temperature, wheel rotation speed and other conditions. The TPMS tire sensors are configured to receive electronic signals and send electronic signals wirelessly from inside the wheel to an electronic control unit or module (ECU) in the vehicle which typically is connected to alert signals in the instrument panel in the interior of the passenger compartment. If a wheel sensor detects a tire pressure or other condition in a tire that is above or below a predetermined level, the sensor transmits a signal that is received by the ECU and an audio/visual indication is triggered to alert the driver to the condition.

Typical TPMS tire sensors generally include a small battery, a circuit board with communication antennas or coils (receive and transmit), an air pressure sensor, a temperature sensor, a rotation detection device or accelerometer, a programmable controller, a data memory storage, and other information depending on the TPM system and sensor capabilities. Each TPMS tire sensor includes a sensor specific identification (ID) is typically in the form of an alpha-numeric code so the vehicle ECU can distinguish between the typical four tires on a passenger vehicle and further alert a driver which vehicle tire may be experiencing conditions outside of an acceptable range.

Conventional TPMS sensors in the tires are typically powered by an internal battery. To increase sensor battery life, the TPMS sensors are often in a "sleep" mode, not actively transmitting tire data. When a reading of the TPMS sensor is needed, a TPMS tool is needed to "trigger" or awaken the sensor to induce the TPMS sensor to emit the measured tire data and sensor ID. This triggering of TPMS sensors is often used in vehicle service garages where technicians as part of a routine data or safety check of vehicles, will check the conditions of the tires through triggering the TPMS tire sensors with a TPMS trigger tool. Typical TPMS tire sensors are programmed to be triggered through receipt of a low frequency (LF) signal, typically 125 kilohertz (kHz). The tire sensor then wirelessly emits a data signal, typically at 315 or 433 megahertz (MHz) containing the measured data from the tire. Conventional, sophisticated TPMS tools will decode the received tire sensor signal, retrieve from tool memory the proper protocol to communicate with the particular vehicle ECU, and wirelessly send a recoded data signal to the vehicle ECU to reprogram or relearn the ECU with the new TPMS sensor information.

It is sometimes necessary to change the tires and/or the sensors housed in them, especially when the sensor is defective. Other examples impacting the TPM system include when the tires are rotated for wear, or snow tires are installed, which changes the location of the TPMS sensors or the new tires include new sensors. Thus, when a user brings his/her motor vehicle to the garage, the garage must determine the type of pressure sensor housed in the tires.

There are many different commercial manufacturers of TPMS sensors. Each sensor manufacturer may use a certain signal communication protocol required to communicate with the TPMS sensor in order for TPMS sensor to awaken and emit the sensor ID and measured data. Communication protocols means a set of rules (e.g. how the wireless data signal is encoded) and procedures for transmitting and receiving data between the TPMS sensor and another device, for example a TPMS trigger tool.

There are also many different vehicle OEMs which include TPMS systems. Indeed, the same vehicle model, manufactured in the same year, may have different types of TPMS sensors, i.e. sensors with different communication protocols. For example, the type of sensor and its communication protocol can be retrieved by the VIN code of the vehicle, but it can be time consuming and tedious to search for this information. Furthermore, if the tires are not the original ones, it is not possible to find the type of sensor currently fitted in the tires. Combined with the many TPMS sensor manufacturers, there are hundreds of different combinations of vehicle manufactures and TPMS sensors making it difficult and time consuming for service garage technicians to identify what TPMS sensors are on a particular vehicle and the proper communication protocol required to communicate with the vehicle sensors.

Typically, service garages use a sensor activation device in which the communication protocols of the different sensors are stored, and initiate a "scan," i.e. the sensor activation device emits an activation signal according to a first communication protocol, then the device checks that the TPMS sensor has not emitted a feedback signal, if this is not the case, then it emits an activation signal according to another protocol, etc., until the TPMS sensor emits a signal in response to an activation signal. By determining the communication protocol used by the TPMS sensor, the TPMS sensor can be positively identified. The sensor activation device may be referred to as a TPMS tool or trigger device.

This scanning process can be very time consuming due to the large number of vehicle OEMs and TPMS sensor manufacturers, and it can take several minutes to review all the protocols. Further, some TPMS sensors have a sleep option after activation. In order to limit the risk of collision or interference between the signals emitted by the sensors, the sensors, after being activated, go into an inactive state for a predetermined time, i.e. they do not emit any more for a predetermined time after emission of a response signal. This inactivity time can also be referred to as the "dead time." This predetermined dead time is an additional problem, because the same activation signal can activate several sensors of the vehicle, the device being generally configured to process only the closest sensor, then ignores the other sensors, but these having been activated, they are no longer activatable for a given time. Therefore, an activation signal that can activate sensors operating according to different communication protocols coupled with the dead time of certain sensors significantly extends the scanning time of said sensors and leads to errors in the detection of the protocol used by the sensor (and therefore of the type of sensor).

Furthermore, the last problem in the detection of the sensor mounted in a tire can also be linked to the fact that the same type of sensor can be mounted in vehicles of very different masses, resulting in the fact that the reference pressure of said tire is not the same. This is because current pressure sensors do not indicate a pressure in absolute value, but a relative pressure value on a given scale, this scale is therefore variable and is defined according to the vehicle. More specifically, a sensor sends the pressure it measures by bit coding over a given pressure interval, this interval depending on the vehicle and the calibration performed on the sensor.

It would be beneficial to solve or improve on one or more of these disadvantages and drawbacks.

SUMMARY

Several methods and devices for scanning TPMS sensor communication protocols for passenger vehicles are disclosed, In one aspect, the method includes selecting a make and a model of a motor vehicle. The method may include transmitting one or more activation signals. The one or more activation signals may be transmitted in sequential order according to a scanning protocol. The scanning protocol may be based on a predefined parameter. Each of the one or more activation signals may be associated with a different communication protocol. The method may include stopping the transmission of the one or more activation signals on a condition that a signal from a sensor is received.

In one aspect, a sensor activation device for a motor vehicle electronic tire pressure monitoring system may include at least one sensor activation module. The sensor activation device may include a receiving module configured to receive signals from a plurality of sensors. The sensor activation device may include an electronic unit. The electronic unit may be configured to select a make and model of a motor vehicle. The electronic unit may be configured to transmit one or more sensor activation signals. The activation signals may be transmitted in a sequential order according to a scanning protocol. The scanning protocol may be based on a predefined parameter. Each of the one or more activation signals may be associated with a different communication protocol. The electronic unit may be configured to store information conveyed by the signals from the plurality of sensors. The sensor activation device may include a memory configured to store a database relating to the communication protocols of the plurality of sensors.

In one or more aspects, the predefined parameter may include one or more of a sensor transmission delay between two successive response signals from the sensor, a number of sensor types activated by a specific activation signal, a sensor response time, or a frequency of occurrence of a sensor type. In one or more aspects, the signal received from the sensor may be associated with a communication protocol for enabling reception of the signal. In one or more aspects, the sensor activation device may be configured to store the communication protocol. In one or more aspects, the predefined parameter may be selected by a user or predetermined. In one or more aspects, the sensor activation device may be configured to process the signal received from the sensor according to different communication protocols. In one or more aspects, the sensor activation device may be configured to select a communication protocol from a database. In one or more aspects, each of the communication protocols may include a degree of priority predefined in a database. The degree of priority may be based on the make and model of the motor vehicle.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The embodiments disclosed herein include a method for scanning tire pressure monitoring system (TPMS) protocols, as well as to a device configured for carrying out the scanning method. The device makes it possible, in particular, to activate, communicate and/or reprogram one or more element(s) of electronic tire pressure monitoring systems. This type of device is may be referred to as a "sensor activation device" or a "TPMS tool."

Figure 1:
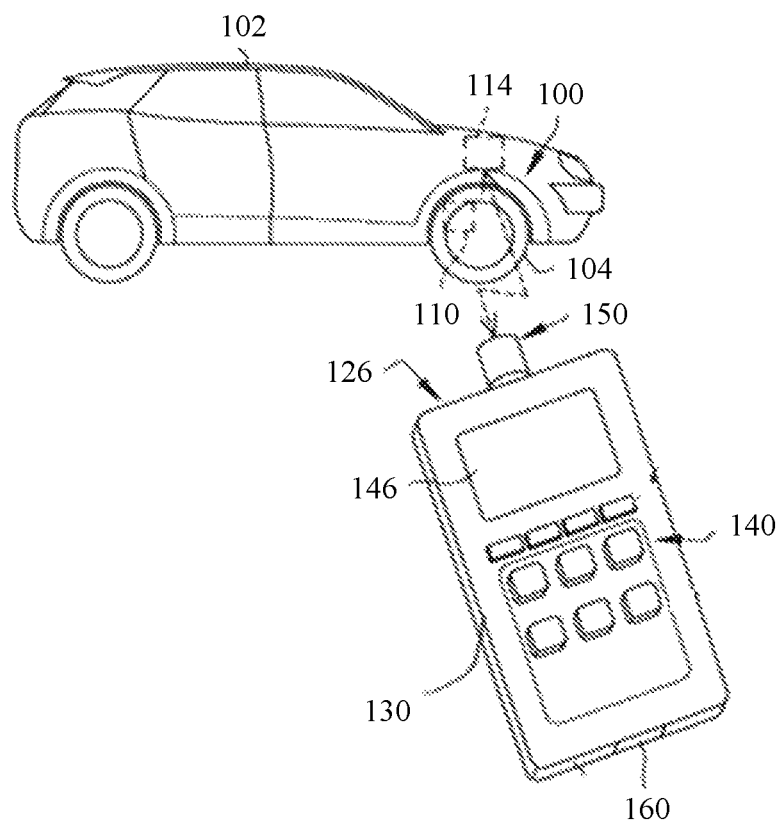
FIG. 1 is a diagram of an example of a sensor activation device.

FIG. 1 is a diagram of an example of a sensor activation device 126. As shown in FIG. 1, a system 100 for resetting TPMS tire sensor data in a vehicle control system is shown. In the example, a single sensor activation device 126 is shown in use with a vehicle 102 having pneumatic tires 104 (only two tires 104 shown for convenience) each having TPMS tire sensor 110. The sensor activation device 126 may be referred to as a TPMS tool. Tire sensor 110 can be a conventional TPMS tire sensor mounted on the valve stem of a tire placing the sensor in fluid communication with the air pressure inside the tire and sealed by the tire rim. The system 100 is useful on all vehicles having TPMS and other products having an interior air volume which may be monitored for one or more conditions, for example, air pressure, temperature and other conditions known by those skilled in the art.

In use with a modern passenger vehicle, system 100 is adapted to operate with a vehicle electronic control unit (ECU) 114 onboard the vehicle and in communication with other vehicle systems including safety systems such as instrument panel alert indicators and vehicle onboard diagnostic systems (OBD). In one example, the vehicle OBD includes an OBD II port which allows connection of external devices to interface and communicate with the OBD and ECU systems of the vehicle. It is understood that sensor activation device 126 may interact and communicate with additional systems on the vehicle as known by those skilled in the art.

Still referring to the exemplary system 100 in FIG. 1, system 100 includes a sensor activation device 126 which is selectively placed or adapted to communicate with the TPMS tire sensors 110 and vehicle ECU 114 as described below. In the example, sensor activation device 126 is a portable, hand-held device having a housing 130, an input keypad 140, a visual display 146, an antenna 150 for sending and receiving electronic and digital wireless signals and/or data to and from sources, for example, the TPMS tire sensors 110 and ECU 114 as generally shown, and an OBD socket 160. The OBD socket 160 may be configured to allow, for example, the connection of the sensor activation device 160 to the vehicle ECU 114, e.g. by means of an OBD cable. It is understood that other devices, including different hardware and software and/or different individual components and configurations making up the sensor activation device 126 known by those skilled in the art may be used. It is further understood that sensor activation device 126 may be a permanent or semi-permanent device (not shown) which is positioned in a service garage bay where a vehicle is selectively positioned in close proximity to the sensor activation device 126 providing for communication between the sensor activation device 126, the sensors 110 and ECU 114.

Figure 2:
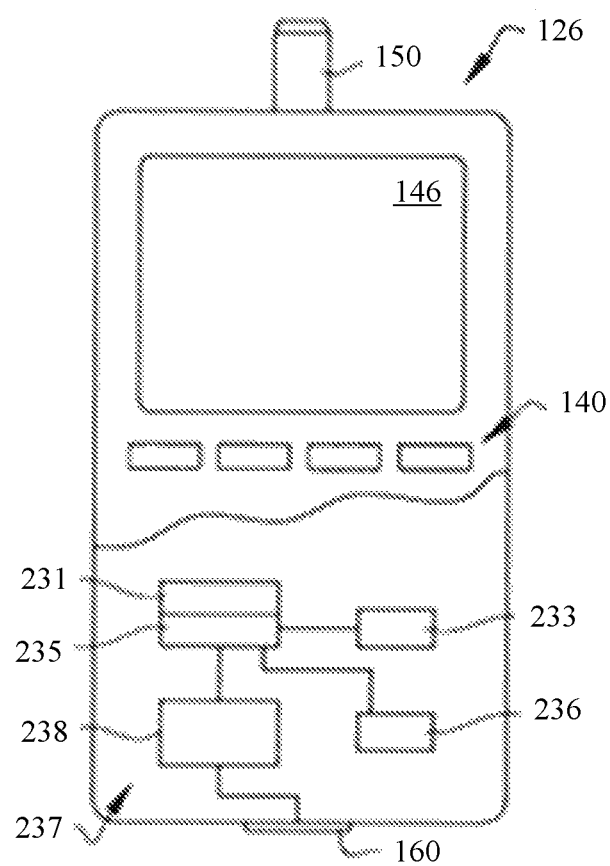
FIG. 2 is an enlarged and detailed view of the sensor activation device shown in FIG. 1.

FIG. 2 is an enlarged and detailed view of the sensor activation device 126 shown in FIG. 1. The sensor activation device 126 includes at least one sensor activation module 231, such as a module for generating sensor activation signals. The sensor activation signals may be continuous and/or modulated. The activation module 231 may be electrically coupled to the antenna 150, which in particular may be configured to enable the generated signals to be propagated as far as possible to the tire sensors 110.

The sensor activation device 126 may include a receiving module 233, for example a receiver configured to receive signals from the tire sensors 110. The sensor activation device 126 may include another antenna disposed in the housing 130 and configured, for example, to receive signals in a frequency band between 300 MHz and 500 MHz, where the tire sensor 110 is configured to emit a signal after being activated by the activation module 231.

The sensor activation device 126 may include an electronic unit 235, such as a processor and a memory, configured to store and/or process information conveyed by the signals from the tire sensors 110. The signals may be received via the receiving module 233. In some embodiments, the electronic unit 235 may be electrically coupled to a memory 236. The memory 236 may be configured to store a database relating to communication protocols of the plurality of sensors. Each of the communication protocols may include a degree of priority predefined in a database. The degree of priority may be based on the make and/or the model of the motor vehicle.

The electronic unit 235 may be configured to select a make of a motor vehicle, a model of a motor vehicle, or both. The electronic unit 235 may be configured to transmit one or more sensor activation signals. The one or more sensor activation signals may be transmitted in sequential order according to a scanning protocol. The scanning protocol may be based on a predefined parameter. In one or more embodiments, each of the one or more activation signals may be associated with a different communication protocol. The electronic unit 235 may be configured to store information conveyed by the signals from the plurality of sensors. The electronic unit 235 may be configured to process the information conveyed by the signals from the plurality of sensors.

The predefined parameters may include one or more of a sensor transmission delay between two successive response signals from the sensor, a number of sensor types activated by a specific activation signal, a sensor response time, or a frequency of occurrence of a sensor type. The predefined parameter may be selected by a user or it may be predetermined.

The sensor activation device 126 may include a communication module 237. The communication module 237 may be configured to communicate with a motor vehicle onboard computer such as ECU 114 for transmitting information from at least one of the tire sensors 110, where the information may be received via signals from the tire sensors 110.

For example, the communication module 237 is an OBD module which includes an OBD communication management circuit 238 and the above-mentioned OBD socket 160. It should be noted that the OBD communication management circuit 238 can also be integrated into the electronic unit 235. It should also be noted that the activation signals may be continuous or modulated electromagnetic signals emitted by the activation module 231, which has, for example, a frequency of 125 kHz.

Figure 3:
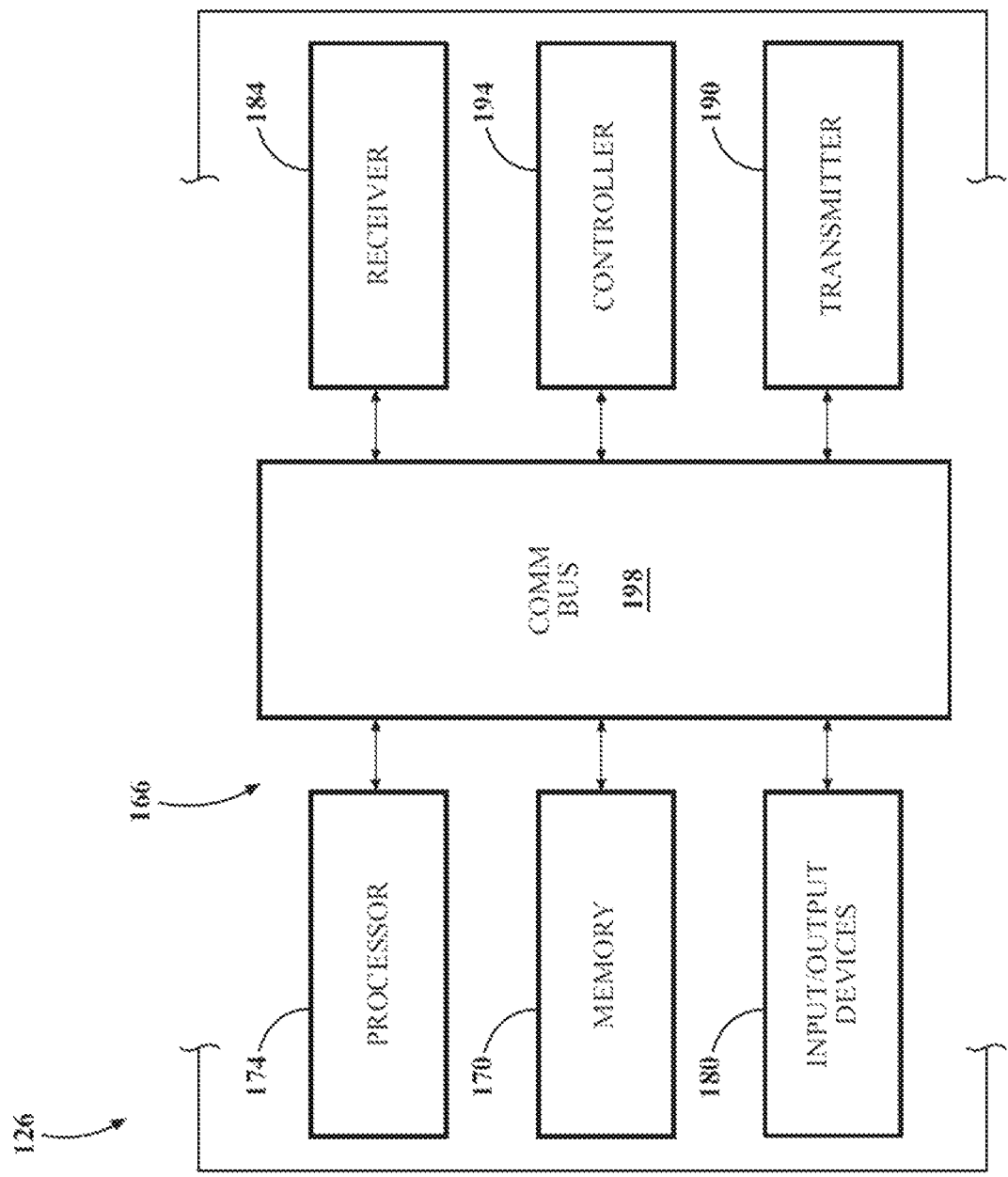
FIG. 3 is a diagram of an example of a control system for the sensor activation device shown in FIGS. 1 and 2.

FIG. 3 is a diagram of an example of a control system 166 for the sensor activation device 126. In the example, control system 166 includes a conventional memory storage device 170 which may include conventional permanent (read only memory, ROM) and/or non-permanent data memory storage devices (random access memory, RAM) on a medium for storing and recalling digital data, software programs, operating systems, executable instructions and other information known by those skilled in the art. Examples of storage devices and media include a hard disk drive, solid state drive and other temporary and permanent memory data storage devices known by those skilled in the art.

Exemplary control system 166 further includes a conventional microprocessor 174 for processing executable instructions, manipulating information, making calculations and/or other functions known by those skilled in the art. Also shown by example are input/output device port(s) 180 for use with, for example, external devices which may be connected to the sensor activation device 126 and placed in communication with the control system 166 to send and receive data, information, power and other signals.

Exemplary control system 166 further includes a receiver 184 which is adapted or operable to detect and collect electronic signals, digital signals, and other signals either through wired connections or through wireless communication, for example from the TPMS tire sensors 110 and ECU 114. In one example, receiver 184 is in communication with antenna 150 on the sensor activation device 126 as generally shown in FIG. 3. In one aspect described further below, receiver 184 receives radio frequency (RF) data signals from the TPMS tire sensors 110 when the TPMS tire sensors 110 are activated as described above. Conventional TPMS tire sensors 110 transmit RF signals including sensor ID and other information at a frequency between 314-434.2 Megahertz (MHz). The sensor activation device 126 then communicates that data to the processor 174 for decoding the received tire sensor signal data according to preprogrammed signal decoding instructions stored in the memory storage device 170. The decoded tire sensor 110 data is temporarily stored in memory 170 pending emission by the sensor activation device 126 of a second TPMS tire sensor data signal which simulates the received TPMS tire sensor data signal from the TPMS tire sensors 110. The sensor activation device 126 thereafter sends the second or simulated TPMS tire sensor data signal to the ECU 114 as further described below.

Exemplary system 100 control system 166 further includes a transmitter 190 which is adapted or operable to wirelessly emit signals to, for example, activate or awaken TPMS tire sensors 110 as described above. A common activation frequency signal used to activate TPMS tire sensors 110 is in a low frequency (LF), for example, 125 KHz (kilohertz). In one example, the transmitter 190 is in communication with the antenna 150 to focus and direct the emission and/or transfer of data signals from the sensor activation device 126. In one aspect, a transceiver-type device (not shown) is used which functions both as a receiver and a transmitter for receiving and emitting wireless signals respectively. It is understood that the sensor activation device 126, tire sensors 110, and the vehicle control systems may receive and emit/transmit signals having alternate frequencies, carrying additional or alternate data/information and having different characteristics known by those skilled in the art.

Exemplary control system 166 also includes a control module 194 to direct, coordinate and sequence functions and other operations of the control system 166 and its components according to preprogrammed instructions based on predetermined features, functions and operations of the sensor activation device 126 and system 100. The above control system 166 exemplary components are in one aspect connected to a communication bus 198 allowing communication between some or all of the above control system 166 components. Other devices for the selective or open communication between the above control system components known by those skilled in the art may be used. It is further understood that alternate or additional control system 166 hardware, software and/or operating systems known by those skilled in the art may be used.

Figure 4:
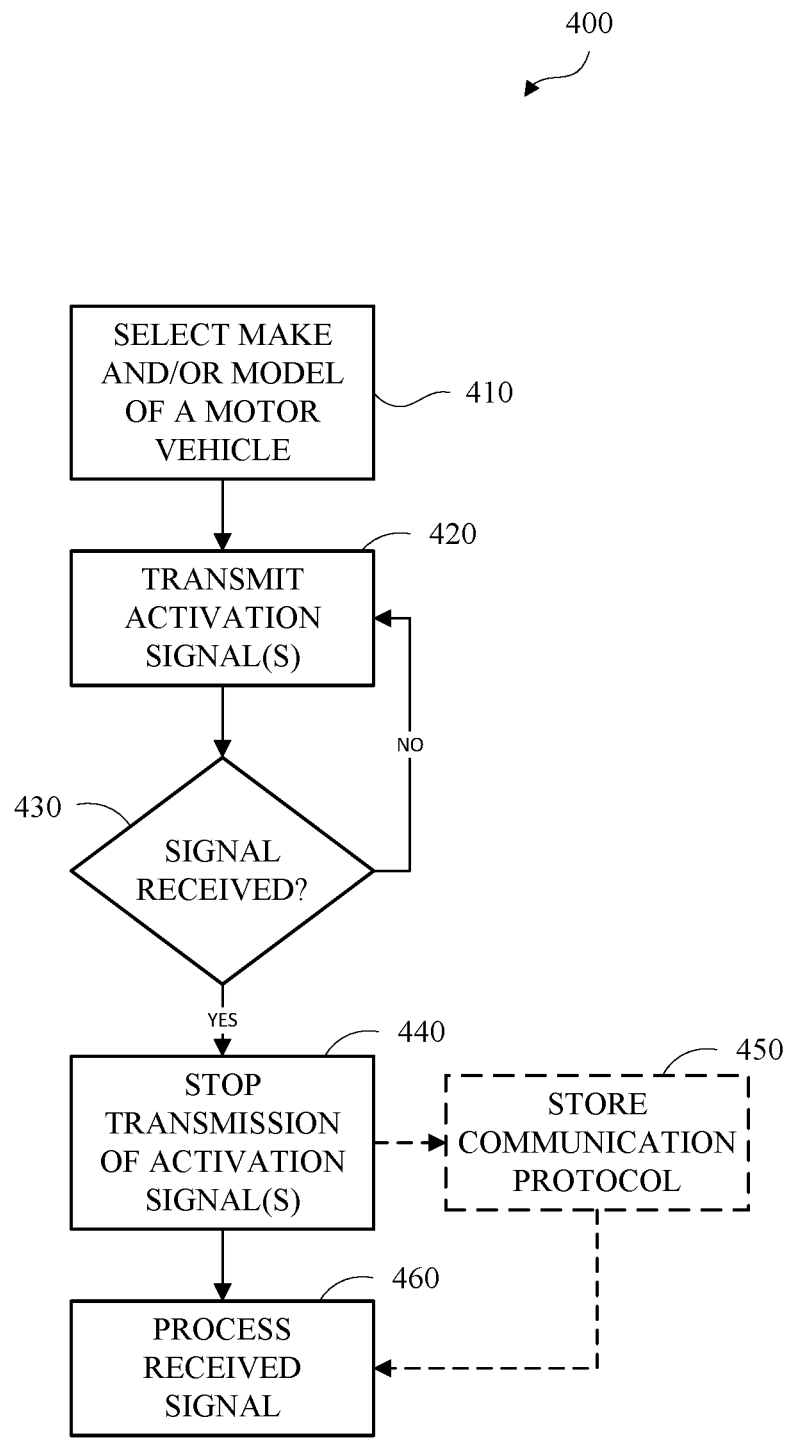
FIG. 4 is a flowchart of an example of a scanning method.

FIG. 4 is a flowchart of an example of a scanning method 400 implemented by the sensor activation device 126 when a user of the sensor activation device 126 wishes to know, for example, the type of sensor mounted in a motor vehicle tire. The method 400 for scanning the communication protocols for sensors of a motor vehicle electronic tire pressure monitoring system may include selecting 410 a make of a motor vehicle, a model of a motor vehicle, or both. For example, the selection may be performed using a human-machine interface (HMI) such as a keyboard and/or touch screen. The method 400 may include transmitting 420 one or more sensor activation signals and determining 430 whether a signal is received from a sensor in response. Each activation signal may be transmitted according to different communication protocols. The transmission of activation signals may be performed sequentially. The sequential order of transmission of the signals may be according to a scanning protocol. The scanning protocol may be based on predefined parameters. Accordingly, an activation signal is transmitted according to a first protocol, and then a check is made as to whether or not a response signal has been received. If, after a predetermined time, there is no reception of a response signal, then an activation signal is sent according to another communication protocol. The transmission of activation signals is iterated according to different communication protocols until a response signal is received, in which case the transmission of activation signals is stopped 440. The method 400 may include processing 460 the signal received from the sensor according to different communication protocols. In some implementations, the method 400 may include selecting a communication protocol from a database.

This method 400 may also include a step of storing 450 the communication protocol that enabled the emission of an activation signal activating the pressure sensor. In particular, the sensor activation device 126 contains in a memory a database relating to the pressure sensors mounted in motor vehicles. Thus, the communication protocols will first be sorted by make and model and then ordered according to different parameters. The parameters may include one or more of the time delay between two successive response signals from the sensor, also referred to as the sensor "dead time," the number of sensor types activated by a given activation signal, the sensor response time, and the frequency of occurrence (or the prevalence) of a sensor type.

For example, the user of the sensor activation device 126 selects the make and then the model of the vehicle on which he/she wants to identify the pressure sensor. Then, the sensor activation device 126 may present one or more possible options. For example, the activation device 126 may perform a scan based on the frequency of occurrence of the sensor type or on the duration of the dead time depending on the sensor type. In one or more embodiments, an on-board database may include information on the sensors and their communication protocols, including the dead time of each of the sensors. Thus, after the user has selected the make and/or the model of the vehicle, the number of communication protocols is then restricted to those sensors that have actually been mounted on that vehicle, as well as reprogrammable sensors that are compatible with that vehicle. Then, the user may select one or more parameters that may be most relevant to him/her. In an example, if the user selects "sensor dead time," then the activation signals are sent from the communication protocol (and its associated sensor type) with the longest dead time to the protocol with the shortest dead time.

Similarly, if the user selects by frequency of occurrence of the sensor type, the database includes an order of priority relative to the frequency of occurrence of the communication protocols used for that vehicle model. That is to say that for a given vehicle model, the frequency of the type of sensor mounted on the vehicle is integrated into the base (either directly or by an index) and makes it possible to start the scan with the most represented type of sensor. The frequencies of occurrence of the sensor types can be adapted according to the wavelengths of the response signal from the sensor, the wavelength used being characteristic of the geographical area, or by geographical area if the sensor activation device 126 has been located by the user (e.g. by indicating the country when registering the device on-line). In one or more embodiments, these parameters may be combined, it is may be possible to perform a scan by frequency of occurrence taking into account the dead times of said sensors and/or the number of sensor types activated by a given activation signal, in order to reduce the scanning time.

While the invention has been described in connection with certain embodiments, it is to be understood that the invention is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law. One or more elements of the embodiments disclosed may be combined with one or more elements of any other embodiment disclosed.

What is claimed is:

1. A method for scanning communication protocols for a sensor of a motor vehicle electronic tire pressure monitoring system, the method comprising:
    performing a scan based on a make and a model of a motor vehicle; and
    transmitting one or more activation signals in a sequential order according to a scanning protocol based on a predefined parameter.

2. The method of claim 1, wherein each of the one or more activation signals is associated with a different communication protocol.

3. The method of claim 1, wherein the predefined parameter includes one or more of a sensor transmission delay between two successive response signals from the sensor, a number of sensor types activated by a specific activation signal, a sensor response time, or a frequency of occurrence of a sensor type.

4. The method of claim 1, wherein the predefined parameter is selected by a user or predetermined.

5. The method of claim 1 further comprising:
stopping transmission of the one or more activation signals on a condition that a signal from the sensor is received.

6. The method of claim 5, wherein the signal received from the sensor is associated with a communication protocol for enabling reception of the signal, wherein the method further comprises storing the communication protocol.

7. The method of claim 5, further comprising:
processing the signal received from the sensor according to different communication protocols.

8. The method of claim 1, further comprising:
selecting a communication protocol from a database.

9. A method for scanning communication protocols for a sensor of a motor vehicle electronic tire pressure monitoring system, the method comprising:
selecting a make and a model of a motor vehicle;
transmitting one or more sensor activation signals in a sequential order according to a scanning protocol based on a predefined parameter, wherein each of the one or more activation signals is associated with a different communication protocol; and
stopping the transmission of the one or more activation signals on a condition that a signal from the sensor is received.

10. The method of claim 9, wherein the predefined parameter includes one or more of a sensor transmission delay between two successive response signals from the sensor, a number of sensor types activated by a specific activation signal, a sensor response time, or a frequency of occurrence of a sensor type.

11. The method of claim 9, wherein the signal received from the sensor is associated with a communication protocol for enabling reception of the signal, wherein the method further comprises storing the communication protocol.

12. The method of claim 9, wherein the predefined parameter is selected by a user or predetermined.

13. The method of claim 9, further comprising:
processing the signal received from the sensor according to different communication protocols.

14. The method of claim 9, further comprising:
selecting a communication protocol from a database.

15. A sensor activation device for a motor vehicle electronic tire pressure monitoring system, the sensor activation device comprising:
at least one sensor activation module;
a receiving module configured to receive signals from a plurality of sensors; and
an electronic device configured to:
perform a scan based on a make and a model of a motor vehicle; and
transmit one or more sensor activation signals in a sequential order according to a scanning protocol based on a predefined parameter.

16. The sensor activation device of claim 15, wherein each of the one or more activation signals is associated with a different communication protocol.

17. The sensor activation device of claim 15, wherein the predefined parameter includes one or more of a sensor transmission delay between two successive response signals from the sensor, a number of sensor types activated by a specific activation signal, a sensor response time, or a frequency of occurrence of a sensor type.

18. The sensor activation device of claim 15, wherein the predefined parameter is selected by a user or predetermined.

19. The sensor activation device of claim 15, wherein the electronic device is further configured to:
stop transmission of the one or more activation signals on a condition that a signal from the sensor is received.

20. The sensor activation device of claim 1, wherein the signal received from the sensor is associated with a communication protocol for enabling reception of the signal, wherein the method further comprises storing the communication protocol.

21. The sensor activation device of claim 19, wherein the electronic device is further configured to:
process the signal received from the sensor according to different communication protocols.

22. The sensor activation device of claim 15, wherein the electronic device is further configured to:
select a communication protocol from a database.

23. A sensor activation device for a motor vehicle electronic tire pressure monitoring system, the sensor activation device comprising:
at least one sensor activation module;
a receiving module configured to receive signals from a plurality of sensors;
an electronic unit configured to:
select a make and model of a motor vehicle;
transmit one or more sensor activation signals in a sequential order according to a scanning protocol based on a predefined parameter, wherein each of the one or more activation signals is associated with a different communication protocol; and
store information conveyed by the signals from the plurality of sensors; and
a memory configured to store a database relating to communication protocols of the plurality of sensors.

24. The sensor activation device of claim 23, wherein the predefined parameter includes one or more of a sensor transmission delay between two successive response signals from the sensor, a number of sensor types activated by a specific activation signal, a sensor response time, or a frequency of occurrence of a sensor type.

25. The sensor activation device of claim 23, wherein the predefined parameter is selected by a user or predetermined.

26. The sensor activation device of claim 8, wherein each of the communication protocols comprises a degree of priority predefined in a database, wherein the degree of priority is based on the make and the model of the motor vehicle.

27. The sensor activation device of claim 23, wherein the electronic unit is further configured to process the information conveyed by the signals from the plurality of sensors.

* * * * *